United States Patent [19]
Ingalls

[11] Patent Number: 5,971,424
[45] Date of Patent: Oct. 26, 1999

[54] FOLDING HAND TRUCK

[76] Inventor: John T. Ingalls, 211 Dixon St., Juneau, Ak. 99801

[21] Appl. No.: 08/854,947

[22] Filed: May 14, 1997

[51] Int. Cl.$^6$ ....................................................... B62B 1/04
[52] U.S. Cl. ........................................... 280/654; 280/659
[58] Field of Search .................................... 280/651, 639, 280/652, 655, 655.1, 47.17, 47.18, 47.19, 47.24, 47.29, 47.371, 659, 654

[56] References Cited

U.S. PATENT DOCUMENTS

| | | |
|---|---|---|
| 3,102,648 | 9/1963 | Hughes . |
| 3,193,123 | 7/1965 | Wouden . |
| 3,430,972 | 3/1969 | Fiedler ..................................... 280/655 |
| 4,072,319 | 2/1978 | Berger ..................................... 280/47.37 |
| 4,235,449 | 11/1980 | Tarran . |
| 4,286,796 | 9/1981 | Esposito . |
| 4,299,403 | 11/1981 | Brewer et al. . |
| 4,358,124 | 11/1982 | Geschwender . |
| 4,401,319 | 8/1983 | Kazmark ..................................... 280/655 |
| 4,546,995 | 10/1985 | Kassai ..................................... 280/655 |
| 4,921,270 | 5/1990 | Schoberg . |
| 4,950,003 | 8/1990 | Holtz ..................................... 280/655 |
| 4,953,888 | 9/1990 | Stein ..................................... 280/655 |
| 4,993,727 | 2/1991 | Vom Braucke et al. ............... 280/655 |
| 5,026,089 | 6/1991 | Grimmonpre ........................ 280/47.29 |
| 5,056,804 | 10/1991 | Wilson et al. ........................ 280/47.18 |
| 5,356,197 | 10/1994 | Simic ..................................... 280/47.18 |
| 5,433,469 | 7/1995 | Cassels ..................................... 280/655 |
| 5,549,317 | 8/1996 | Dunkle . |
| 5,630,601 | 5/1997 | Vom Braucke et al. ............... 280/655 |

FOREIGN PATENT DOCUMENTS

| | | | |
|---|---|---|---|
| 4019081 | 2/1991 | Germany ..................................... 280/655 |
| 1449440 | 1/1989 | U.S.S.R. ..................................... 280/655 |
| 1 376 745 | 12/1974 | United Kingdom .................... 280/652 |

*Primary Examiner*—Lanna Mai
*Assistant Examiner*—Andrew J. Fischer
*Attorney, Agent, or Firm*—Christensen O'Connor Johnson & Kindness PPLC

[57] ABSTRACT

A collapsible hand truck (10) having storage and operative positions. The truck includes a back frame (12) having a back side, an upper end (16) and a lower end (18). Two wheels (44) are rotatably connected to the back frame lower end (18) at a position offset rearwardly and downwardly therefrom. The offset position is created by aft-extending arms (40). The truck (10) further includes a bail (14) having a front end (20) and an aft end (22). The aft end (22) is rotatably connected to the back frame lower end (18). A strap (50) is provided for maintaining the maximum angular distance between the back frame (14) and the bail (12) during use. In the operative position, the bail (14) is located substantially forward of the back frame (12) and the strap (50) is interconnected between the bail front end (20) and the back frame upper end (16). To reach the storage position, the bail (14) rotates downward and aftward to a location behind the back frame (12) and substantially adjacent to the back frame back side.

7 Claims, 1 Drawing Sheet

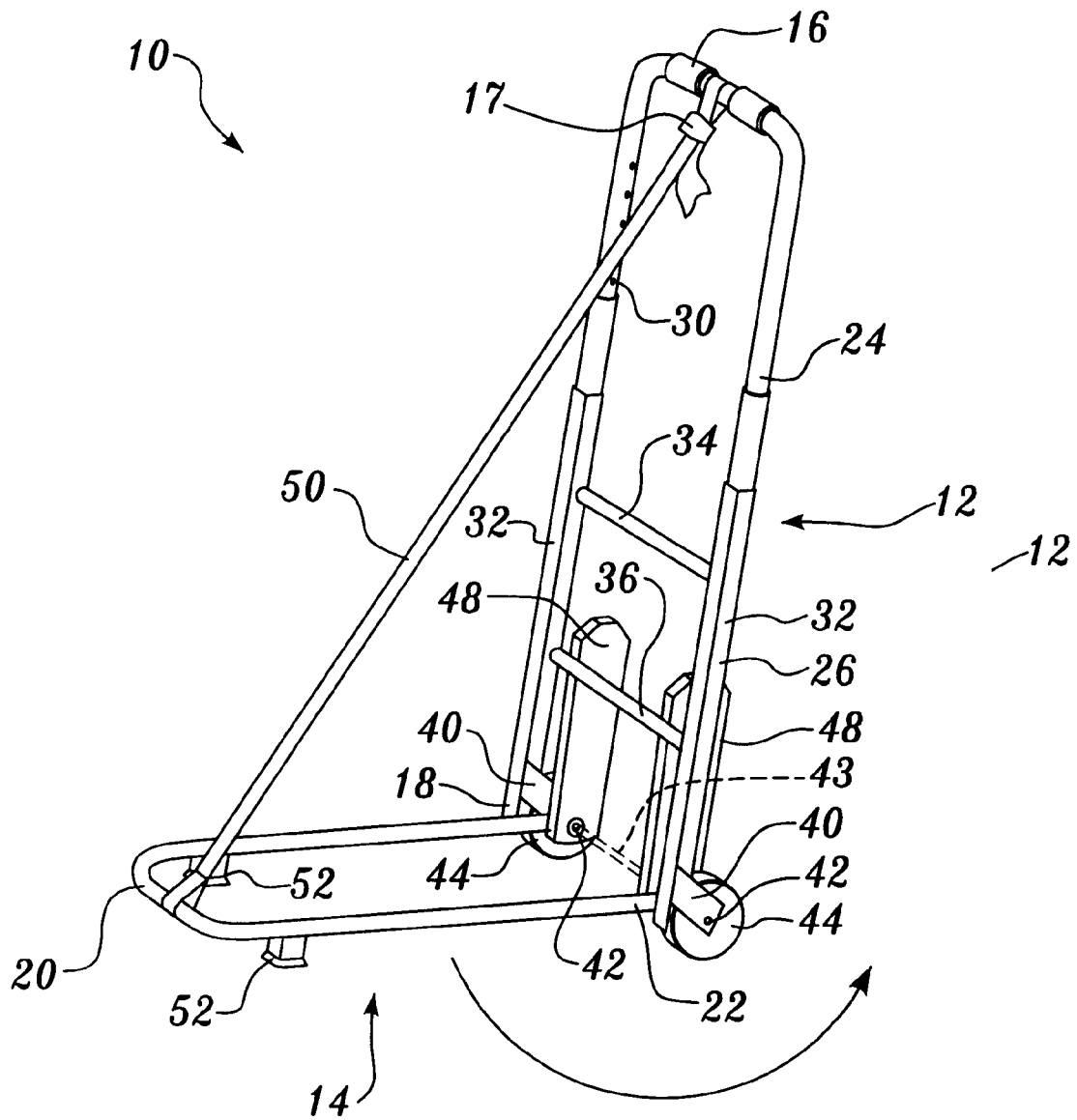

FOLDING HAND TRUCK

FIELD OF THE INVENTION

The present invention pertains to hand trucks in general, and more specifically to folding hand trucks.

BACKGROUND OF THE INVENTION

Hand trucks, and more specifically collapsible or folding hand trucks, are generally known in the art. It is desirable for such trucks to be collapsed into as small and lightweight a form as possible, while still providing a sturdy uncollapsed truck that is capable of handling heavy loads. Additionally, it is desirable to design the truck so that bulky and odd-shaped objects can be easily accommodated. At times, these goals produce incompatible design efforts that are difficult to effectively reconcile.

For example, U.S. Pat. No. 3,102,648 describes various embodiments of a collapsible hand truck in which objects being moved by the device are not balanced upon two wheels, but are instead placed on three or more castor wheels (similar to a cart). One embodiment of the device is collapsible by rotating a bottom member (28, 30) aftward about a lower horizontal axis of rotation. This design appears to be strong during use, but is bulky when collapsed.

The same is true for U.S. Pat. No. 3,193,123, which describes a hand truck having an extension E that is rotatably connected to a frame F at an axis of rotation distinct from the axis of rotation of a pair of wheels W. Secondary wheels S are attached along the upper rear side of the frame F. When the extension E is rotated downward, it rests upon a toe plate T. Both the toe plate and extension may be used to support heavy loads. Alternatively, the hand truck may be rotated 90° such that the frame is horizontal and the secondary wheels S are in contact with the ground. In this orientation, a load may be placed on top of the frame and the extension may act as handles.

U.S. Pat. No. 4,235,449 describes a hand truck capable of collapsing into a step stool. The hand truck includes a foot 18 as well as an extension bed 44. The extension bed is rotatably connected along the inside of frame side rails 12 at an axis of rotation distinct from the axis of rotation of a pair of wheels 42. This design appears to be sturdy, but the forward location of the bed in the collapsed state prohibits the steps 14 from being flush with the side rails 12.

U.S. Pat. No. 4,286,796 is missing its drawing sheet 2 of 2. This is not due to an error of our searcher, but instead reflects a misfiled drawing at the U.S. Patent and Trademark Office. Using only drawing sheet 1 of 2 (and the written text), it appears that the '796 patent describes a collapsible hand truck in which a lower platform 15 is upwardly rotatable about the axis of rotation of the wheels. A cross bar 33 prohibits the platform 15 from extending past a generally horizontal orientation. Spring hoops 35, 36 squeeze the arms 31, 32 of the platform 15 against the frame 11, thus holding the platform firmly in position when it is fully extended.

U.S. Pat. No. 4,299,403 describes a foldable luggage carrier having a lower platform 14 rotatably connected to the inside of a main frame 10. A bottom section 44 (i.e., stop) is provided to support the platform and prevent it from rotating downward more than roughly 90 degrees. To collapse, the platform is rotated forward about an axis of rotation at a pair of wheels 16.

U.S. Pat. No. 5,549,317 describes a foldable hand truck having a telescopically extendible handle 18. A load support plate 64 is rotatably connected to the lower end of a main support assembly 14. A luggage support frame 62 is additionally provided between the main support assembly 14 and the load support plate 64. Both the luggage support frame 62 and the load support plate 64 are pivoted upward to reach the folded state. These components are rotated about an axis of rotation distinct from the axis of rotation of the wheels.

While the above patents describe collapsible or folding hand trucks, they are not particularly compact as well as sturdy. Additionally, none of the prior art devices above describe a hand truck having a bottom frame that provides numerous angular positions of the bottom frame with respect to the back frame. This attribute is highly desirable with loads that are bulky or oddly shaped. Thus, a need exists for a folding hand truck that is conveniently configurable between its in-use position and a storage position where the storage position is extremely low profile, while the in-use position is strong, sturdy, and capable of handling heavy and bulky loads. The present invention is directed to fulfilling this need.

SUMMARY OF THE INVENTION

In accordance with the present invention, a collapsible hand truck having storage and operative positions is provided. The truck includes a back frame having a back side, an upper end and a lower end. The truck further includes a bottom frame having a front end and an aft end. The bottom frame aft end is rotatably connected to the back frame lower end. A pair of wheels is rotatably connected to the back frame lower end at a position offset rearwardly and downwardly therefrom. The offset position is created by the use of aft-extending arms. The wheels are rotatably connected to the arms via one or more wheel axles passing transversely through the arms. In preferred embodiments, the bottom frame aft end is rotatably attached to the wheel axles at locations inboard of the wheels. A strap is available to maintain a maximum angular distance between the bottom and back frames during use. The strap and/or its connections to the frames is adjustable in length to provide a plurality of useful angular orientations of the bottom frame with respect to the back frame. In preferred embodiments, a friction device is present at rotatable connection between the back frame and the bottom frame to prevent their relative motion from occurring too freely.

In the operative position, the bottom frame is located substantially forward of the back frame and the strap is interconnected between the bottom frame front end and the back frame upper end. The strap is connected between the back frame upper end and the bottom frame front end. To reach the storage position, the strap is unfastened at one end and the bottom frame is rotated downward and aftward to a location behind the back frame and substantially adjacent to the back frame back side. The strap is then wrapped about the frames and secured to maintain their relative positions.

In accordance with aspects of this invention, the compactness of the truck in the storage position may be enhanced by forming the back frame from an upper portion that is slidably engaged with a lower portion. An adjustable latching mechanism may be used to maintain their relative relation.

In accordance with aspects of this invention, the bottom and back frames are formed of a number of interconnecting structural members. In a preferred embodiment, the hand truck includes a back frame formed with a lower portion having two upright side members and a lower horizontal support bar spanning between the side members. The wheels are connected to the back frame lower end via one or more arms that extend rearward and downward from the lower end of each back frame upright side member. A transverse axle passes through each pair of arms and supports a wheel. The bottom frame aft end is rotatably connected to the wheel axles at locations inboard of the wheels. To improve the structural performance of the truck and to improve the truck's performance in traversing steps, skid plates may be attached between the lower horizontal bar and the wheel axles.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein:

FIG. 1 is a perspective view of the folding hand truck of the present invention.

DETAILED DESCRIPTION OF THE PREFERRED EMBODIMENT

Referring to FIG. 1, the present invention is a hand truck 10 that is capable of being collapsed between operative and storage positions. The hand truck 10 includes a back frame 12 and a bottom frame each formed of interconnected structural members. According to preferred embodiments, the bottom frame is a U-shaped bail 14 as shown in FIG. 1. Both the back frame and bail 14 have generally a planar rectangular planform shape. The back frame 12 has an upper end 16 and a lower end 18. The bail 14 has an arcuate front end 20 and an aft end 22.

As shown, the back frame 12 includes an upper portion 24 that is in telescopic or other slidable relation to a lower portion 26. An adjustable latching mechanism is provided to keep the upper and lower portions in constant relative relation. In FIG. 1, the latching mechanism includes one or more latch pins 30 positioned transversely through holes (too small to show) in the upper and lower telescopic portions 24, 26. When collapsed, the back frame 12 is roughly the same length (i.e., from the upper end 16 to the lower end 18) as the bail 14 (i.e., from the front end 20 to the aft end 22.)

The back frame lower portion 26 further includes two upright structural side members 32 and various cross members interconnecting the side members. Shown in FIG. 1 are upper horizontal support bar 34 and lower horizontal support bar 36 cross members. The support bars 34, 36 may positioned flush with the upright structural side members 32 forward surfaces. In general, the back and bottom frame structural members can be formed from any one of a number of available materials, e.g., metal, plastic, PVC, composites, wood, etc. It is preferred, however, to select materials that are strong, durable, and lightweight, such as extruded aluminum.

A pair of wheels 44 are provided and positioned aftward and slightly downward from the back frame lower end. Preferably, as shown in FIG. 1, one wheel is connected to the lower end of each upright structural side member 32. The connection includes one or more rearwardly extending arms 40 through which a transverse wheel axle 42 is rotatably secured. The wheels 44 are positioned on the wheel axles 42. Alternatively, a single wheel axle may be used and passed through all extending arms. See phantom item 43. A single wheel axle is particularly useful in allowing a person to tip the truck aftward by pressing their foot against the axle. This is more important in transporting larger or heavier loads.

Referring back to FIG. 1, the extending arms thus create an appropriate offset distance of the wheels relative to the back frame 12. The wheel radii are slightly less than the length of the rearwardly extending arms so that the wheels may rotate freely on their axle without interference from the arms or the back frame. The bail aft end 22 is also rotatably connected to the transverse wheel axles 42, preferably inboard of the extending arms 40. Therefore, the width of bail aft end 22 is less than the width of the back frame lower end 18.

To lessen the stresses at the extending arm connections to their respective upright side members, two elongated skid plates 48 may be fixedly attached at their upper ends to the lower horizontal support bar 36 and fixedly attached their lower ends to a transverse wheel axle 42. The skid plates 48 are positioned inboard of the upright side members 32. The bail aft end 22 is connected to the axles 42 at locations between each skid plate 48 and its respective upright side members 32. The skid plates additionally improve the truck's performance in traversing steps. The skid plates slide across the step, thereby improving the balance of the truck during stair travel.

It is important to the present invention to provide a small amount of friction between the bail 14 and the back frame 12 during relative pivoting. There are no rigid latching mechanisms present to encumber their pivotal movement, but there is preferable some type of friction device to prevent the frame and bail from pivoting too freely. A preferred friction device is to simply use a bent washer at the connection of the bail aft end to the wheel axle (or axles). This provides some friction to prevent unintended or slight changes in angular relation between the bail and back frame, while not producing so much friction that would inhibit intended relative rotation. It should be possible to position the bail at virtually any angle, acute to obtuse, relative to the back frame.

A flexible strap 50 or the like is provided to keep the angle between the back frame and bail from increasing. The strap 50 can be formed from any one of a number of available materials, e.g., nylon, canvas, rope, leather, etc. One or both ends of the strap may include a buckle, D-ring, clip, snap, Velcro, etc. for use in securing the strap to a frame member. In the preferred embodiment of FIG. 1, the strap is permanently attached to the bail front end 20 and fastened to the back frame upper end 16 using an adjustable fastener 17.

During use, the strap 50 limits increased angular movement of the bail 14 with respect to the back frame 12, though not encumbering decreased angular movement. By changing the length of the strap 50, the maximum angular orientation of the bail 14 with respect to the back frame 12 can be altered. This allows the bail 14 to be configured in numerous angular positions with respect to the back frame 12 to accommodate the weight, size and shape of load being transported.

Crutch tips 52 are attached to the underside of the bail front end. The crutch tips support the bail 14 and the object being moved when the hand truck 10 is at a stand still and not being tilted aftward.

Starting from an operative position as shown in FIG. 1, the hand truck 10 is collapsed to a storage position by unfastening the strap at the back frame upper end 16. The back frame upper and lower portions 24, 26 are telescoped to a retracted state. The bail 14 is then pivoted downward about the wheel axles (i.e., away from the forward surfaces of the back frame 12). Eventually, the bail 14 reaches the rearward surfaces of the back frame 12. With the bail 14 now pivoted to be substantially parallel to back frame 12, the free end of the strap 50 is wrapped around the frame and bail and secured to a structural member.

This collapsed or storage configuration of the hand truck 10 is of extremely low profile. The profile is possible due to the present inventions storage of the bail 14 in the offset space created by the extending arms 40. This use of space is facilitated by placing the frame structural members such that the bail 14 can pivot downwardly around to the rear of the back frame 12.

In addition, the present invention hand truck still allows for the use of supporting cross members to enhance the rigidity and stability of the device without being in the way in the truck's collapsed state. This also creates the opportunity to have a substantially flat back frame forward surface and a substantially flat bail upper surface, thus further improving the stability of objects placed on the truck 10.

To move from a storage position to an operative position, the strap 50 is unfastened, and the bail 14 is rotated first downward and then forward to a position substantially in front of the back frame 12. The back frame upper portion 24 is extended relative to the lower portion 26. An object is positioned on the upper surfaces of the bail 14, and the strap 50 is secured to the back frame upper end 16 to form the desired transport angle between the back frame 12 and the bail 14. The user then pivots the truck 10 rearwardly so that the crutch tips 52 are lifted from the ground, and the truck 10 is ready to be pushed to its destination. The back frame upper end 16 functions as a handle. For people in a rush, the strap 50 may be left connected between the bail front end and the back frame upper end. To move objects onto and off of the bail, the back frame may be tilted forward to ease the strap around or from the object.

As will be appreciated from the above, a hand truck formed in accordance with the present invention provides significant advantages over conventional collapsible hand trucks. Because of the wheel axles locations, the center of gravity on conventional trucks tends to be located behind the wheel-to-ground contact locations when the truck is tilted back during use. In contrast, the center of gravity of the present invention may be located directly above the wheel-to-ground contact locations, by adjusting the angle between the back frame and the bail. This makes it easy for a person to use the present invention truck to push heavy loads, since the person doesn't have to provide a constant balancing force to the truck. In addition, by rotating the bail downward and rearward to eventually meet the aft surfaces of the back frame, the bail takes advantage of the rearwardly offset location of the wheel axles 38. Thus, the back frame is efficiently and compactly stored in the wheels offset space.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A collapsible hand truck having storage and operative positions, the collapsible hand truck comprising:

(a) a back frame having a back side, an upper end and a lower end, the back frame being formed of two slidably-engaged portions located in the same plane;

left and right stationary side arms rigidly attached to the back frame lower end and extending rearward from the back frame; a left wheel axle being transversely located through the left side arm at a distal location a right wheel axle being transversely located through the right side arm at a distal location;

(b) a left wheel and a right wheel, the left wheel being rotatable connected to the left arm at its transverse axle; the right wheel being rotatably connected to the right arm at its transverse axle;

(c) a single-piece bottom frame having a front end and an aft end, the aft end being rotatably connected to the left and right side arms at their corresponding transverse axles, the bottom frame thus rotating relative to the back frame at the left and right wheel axles; and (d) a strap; wherein in the operative position the bottom frame is located substantially forward of the back frame and the strap is connected between the back and the bottom frames to limit the maximum angle therebetween, the bottom frame being otherwise freely rotatable by at least 270 degrees relative to the back frame; and wherein to reach the storage position the bottom frame rotates downward and aftward to a location behind the back frame and substantially adjacent to the back frame back side.

2. The collapsible hand truck formed according to claim 1, wherein in the operative position the strap is connected between the back frame upper end and the bottom frame front end; and wherein in the storage position the strap is used to maintain the location of the bottom frame adjacent to the back frame back side.

3. The collapsible hand truck formed according to claim 1, wherein the back frame includes an upper portion slidably engaged with a lower portion and an adjustable latching mechanism therebetween.

4. The collapsible hand truck formed according to claim 1, wherein the bottom frame is a U-shaped bail, the open end of the U being the aft end of the bottom frame that is rotatably connected to the left and right side arms at their corresponding transverse axles.

5. The collapsible hand truck formed according to claim 1, wherein the bottom frame aft end is rotatably connected to each axle at a location inboard of the wheels.

6. The collapsible hand truck formed according to claim 1, wherein the rotatable connection between the back frame and the bottom frame includes a friction device to present their relative motion from occurring too freely.

7. The collapsible hand truck formed according to claim 1, wherein the strap is adjustable in length to change the angular orientation of the bottom frame with respect to the back frame during use.

\* \* \* \* \*